(12) United States Patent
Leclerc

(10) Patent No.: US 9,575,278 B2
(45) Date of Patent: Feb. 21, 2017

(54) SPLICE HOLDER

(71) Applicant: BELDEN CANADA INC., Saint-Laurent (CA)

(72) Inventor: Loui Leclerc, Saint-Paul (CA)

(73) Assignee: BELDEN CANADA INC., Saint-Laurent (CA)

( * ) Notice: Subject to any disclaimer, the term of this patent is extended or adjusted under 35 U.S.C. 154(b) by 0 days.

(21) Appl. No.: 14/887,658

(22) Filed: Oct. 20, 2015

(65) Prior Publication Data

US 2016/0109674 A1 Apr. 21, 2016

Related U.S. Application Data

(60) Provisional application No. 62/065,934, filed on Oct. 20, 2014.

(51) Int. Cl.
*G02B 6/44* (2006.01)
*G02B 6/255* (2006.01)
*G02B 6/36* (2006.01)

(52) U.S. Cl.
CPC .......... *G02B 6/4471* (2013.01); *G02B 6/2558* (2013.01); *G02B 6/3636* (2013.01); *G02B 6/4454* (2013.01)

(58) Field of Classification Search
CPC .... G02B 6/2558; G02B 6/3636; G02B 6/4471

USPC .................................................. 385/136, 137
See application file for complete search history.

(56) References Cited

U.S. PATENT DOCUMENTS 6,801,704 B1* 10/2004 Daoud ................. G02B 6/4471
385/134
2002/0191939 A1* 12/2002 Daoud ................. G02B 6/4471
385/135
2013/0108225 A1* 5/2013 Ray ...................... G02B 6/4454
385/95

FOREIGN PATENT DOCUMENTS

| CA | 2738193 A1 | 10/2011 |
| CA | 2793108 A1 | 4/2013 |
| CA | 2793113 A1 | 4/2013 |

OTHER PUBLICATIONS

International Search Report of corresponding PCT application No. PCT/CA2015/051050.

* cited by examiner

*Primary Examiner* — Ryan Lepisto
(74) *Attorney, Agent, or Firm* — Hugh Mansfield

(57) ABSTRACT

A splice holder is disclosed comprising elongate opposed members each comprising a plurality of splice receivers each comprising an inner surface defining a plurality of apertures for deceiving a plurality if different diameters of optic fiber splices.

7 Claims, 7 Drawing Sheets

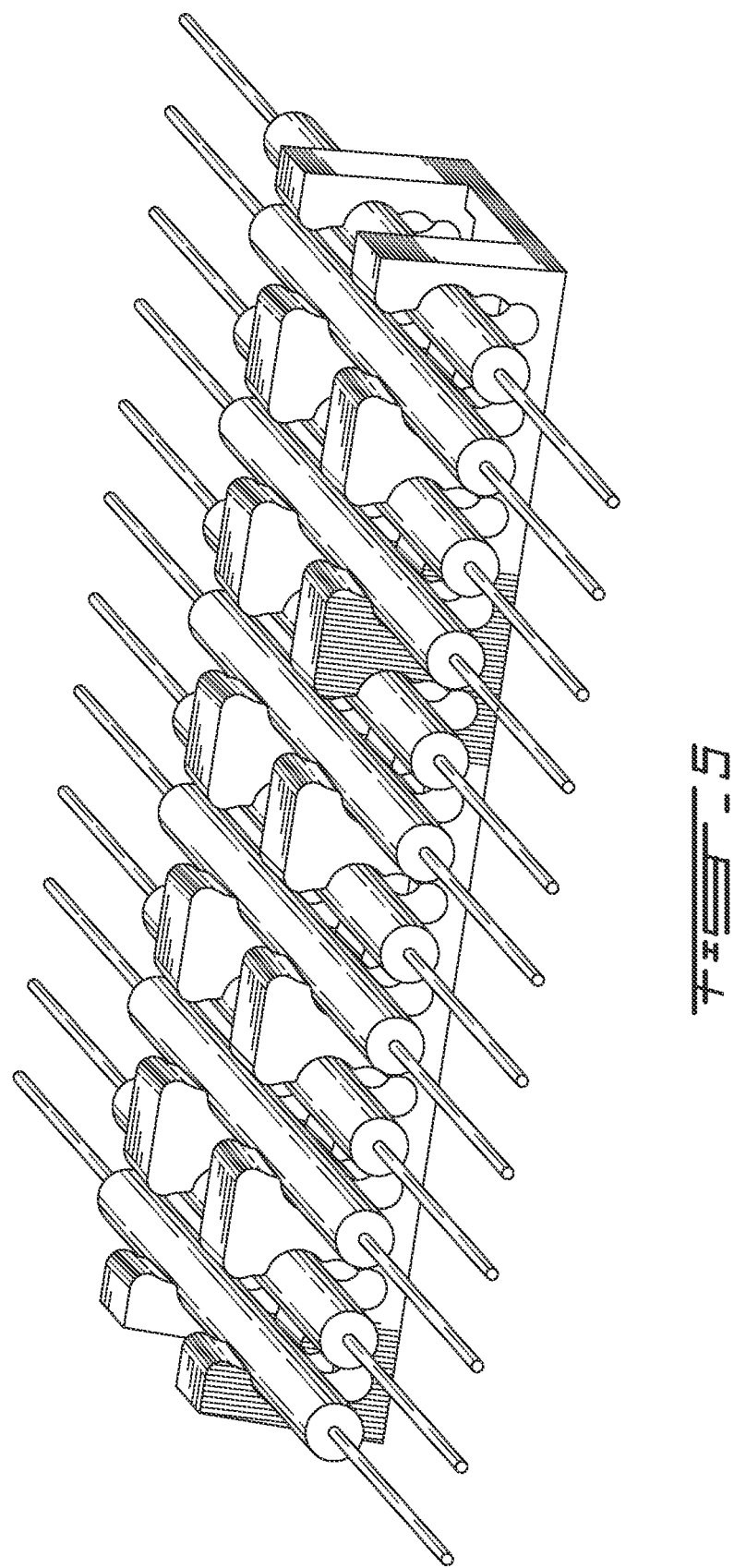

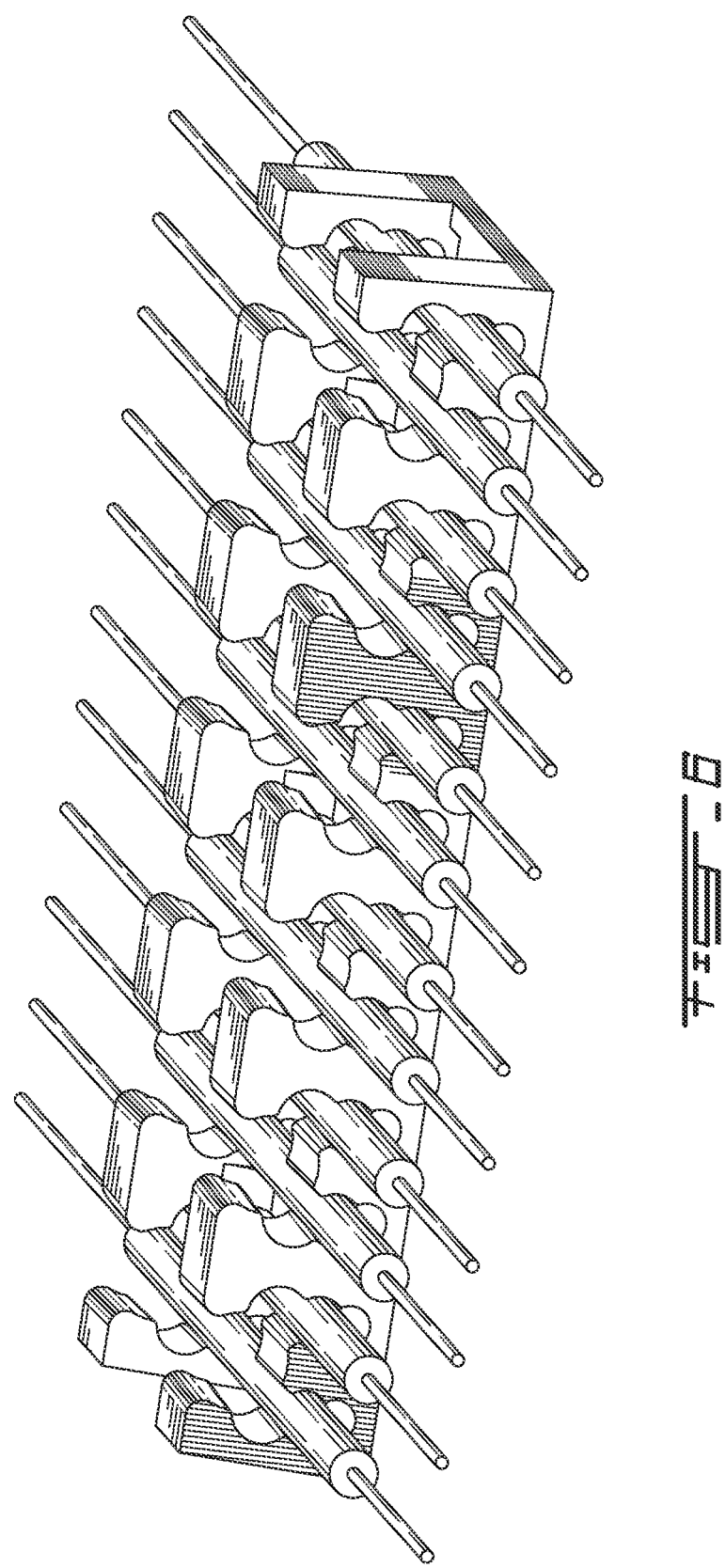

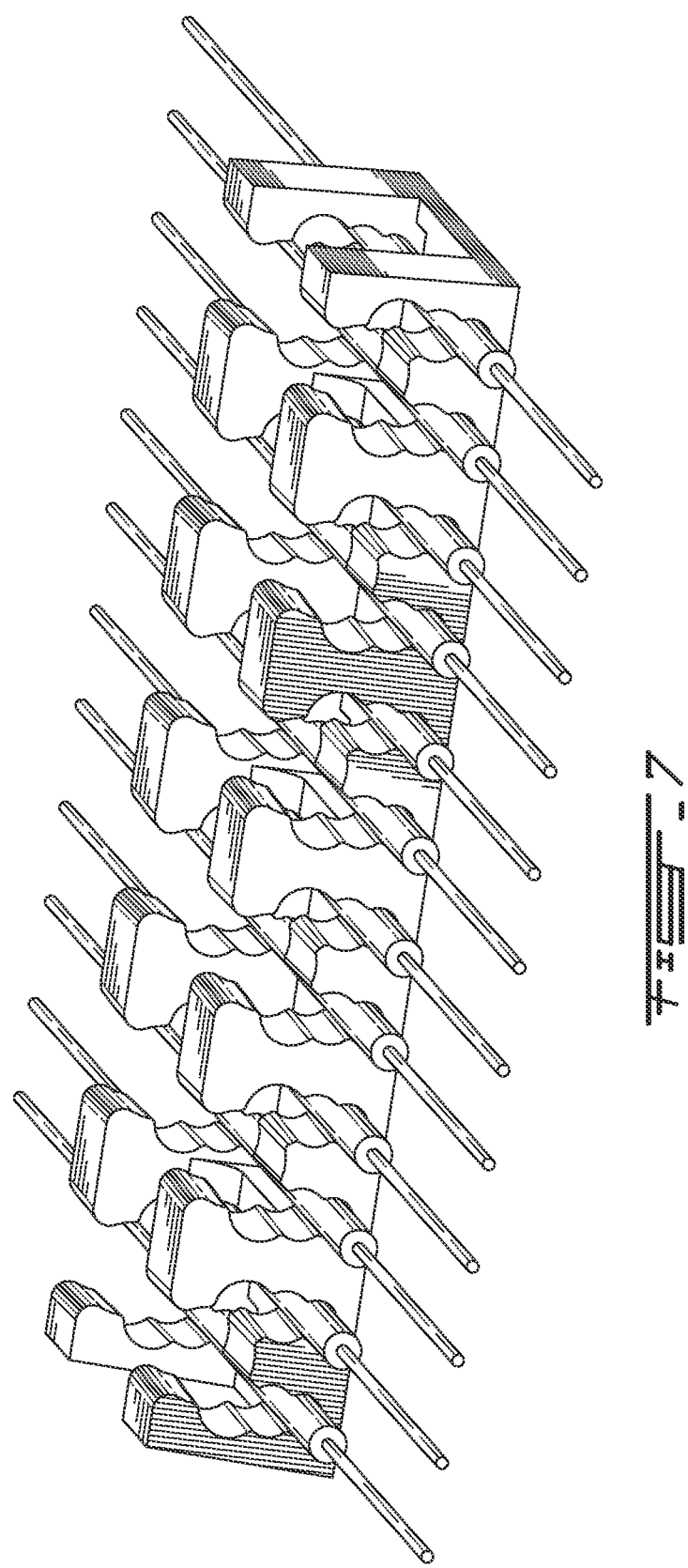

SPLICE HOLDER

CROSS-REFERENCE TO RELATED APPLICATION

This application claims the benefit, under 35 USC §119 (e), of U.S. Provisional Application No. 62/065,934, filed on Oct. 20, 2014 the entirety of which is incorporated herein by reference.

FIELD OF THE INVENTION

The present invention relates to a splice holder.

BACKGROUND TO THE INVENTION

The prior art discloses splice holders for securing in a splice tray which secure splices in place thereby improving the robustness of the spliced connection. One drawback of such splice holders is that they can only accept cable splices of a particular diameter.

SUMMARY OF THE INVENTION

In order to address the above and other drawbacks, there is provided a splice holder comprising an elongate base comprising a flat adhesive lower surface and an upper surface, and a pair of opposed elongate edge members each attached along a respective long outer edge of the base and projecting above the upper surface, each of the edge members further comprising a plurality of flexible splice receivers therein each receiver comprising inner surface defining plurality of apertures of circular cross section and different diameters arranged in parallel and for receiving splices of different diameters therein, wherein adjacent ones of the apertures are joined along a length thereof, wherein an aperture of smaller diameter is adjacent only one aperture of a next larger diameter and an aperture of a largest diameter is adjacent the opening, wherein each of the apertures in a first of the edge members is aligned with a corresponding aperture of a same diameter in a second of the edge members and such that, when a splice is inserted into the receivers via the opening, the splice is secured in parallel to the upper surface and at right angles to each of the edge members.

BRIEF DESCRIPTION OF THE DRAWINGS

FIGS. 4 through 7 provide raised right view of examples of a splice holder and optic fibre splices in accordance with an illustrative embodiment of the present invention.

DETAILED DESCRIPTION OF THE ILLUSTRATIVE EMBODIMENTS

Figure 1:
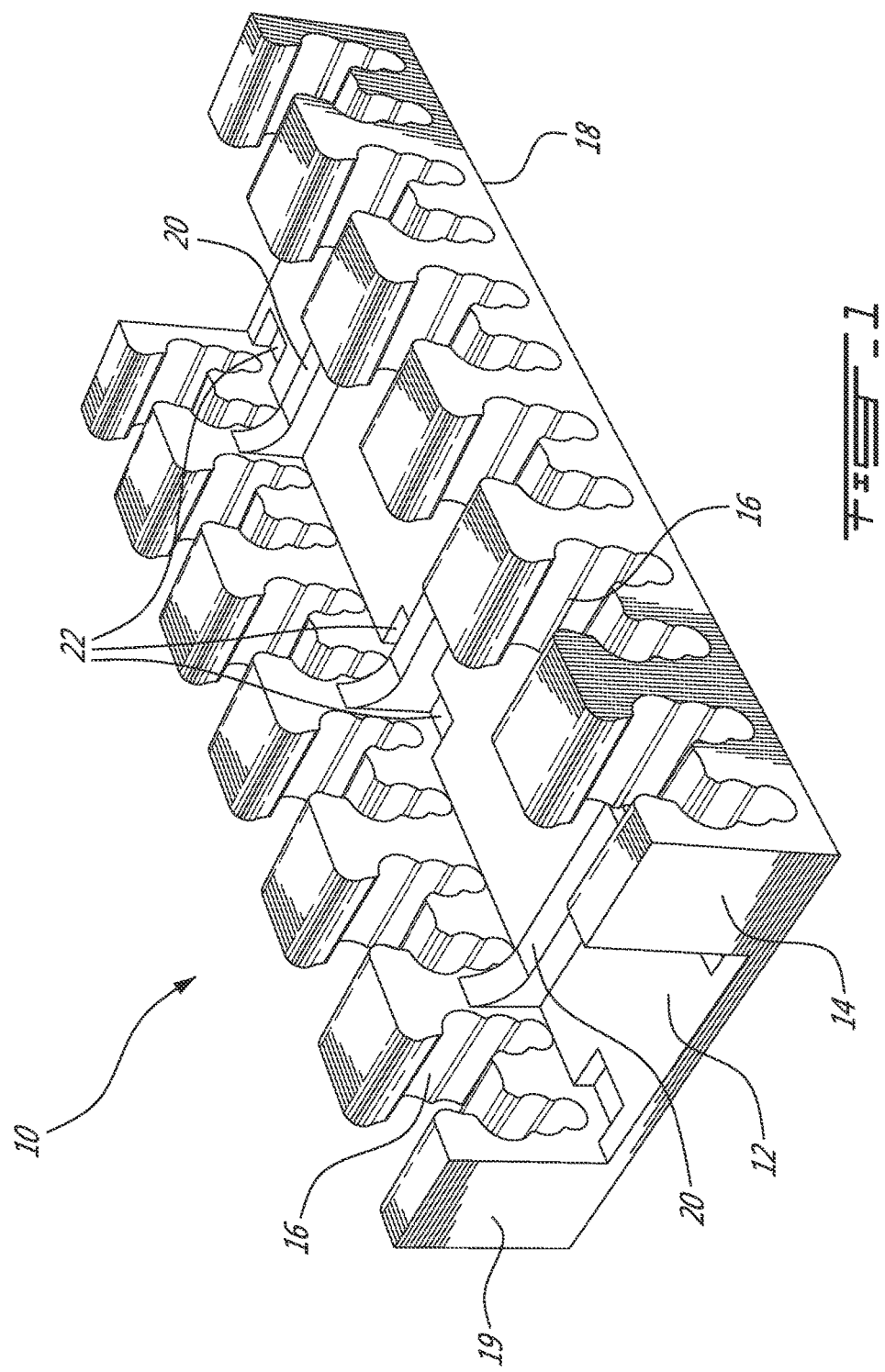
FIG. 1 provides a raised left perspective view of a splice holder in accordance with an illustrative embodiment of the present invention.

Referring now to FIG. 1, a splice holder, generally referred to using the reference numeral 10, will be described. The splice holder 10 comprises a base 12 and a pair of opposed elongate edge members as in 14 defining a space there between above the base 12. Each of the edge members as in 14 comprises a plurality of splice receivers as in 16 moulded or otherwise formed therein. Each splice receiver as in 16 on a first of the edge member 14 is aligned with a respective splice receiver as in 16 on the opposite edge member 14. Each receiver as 16 comprises a complex inner surface defining a plurality of splice receiving apertures of different diameters and which allows the receiver 16 to accommodate a plurality of different splice sizes. Illustratively, the splice holder 10 is manufactured from a slightly flexible non-conductive material such polypropylene or the like.

Still referring to FIG. 1, the splice holder 10 comprises and adhesive such as a double sided tape or the like (not shown) for fastening the underside 18 of the splice holder 10 to a flat surface. Stiffening reinforcements as in 20 can also be provided to improve overall rigidity of the splice 10. Also, in a particular embodiment slots as in 22 can be provided such that the splice holder 10 may be secured to tabs or the like (also not shown) which are inserted through the slots 22.

Figure 2:
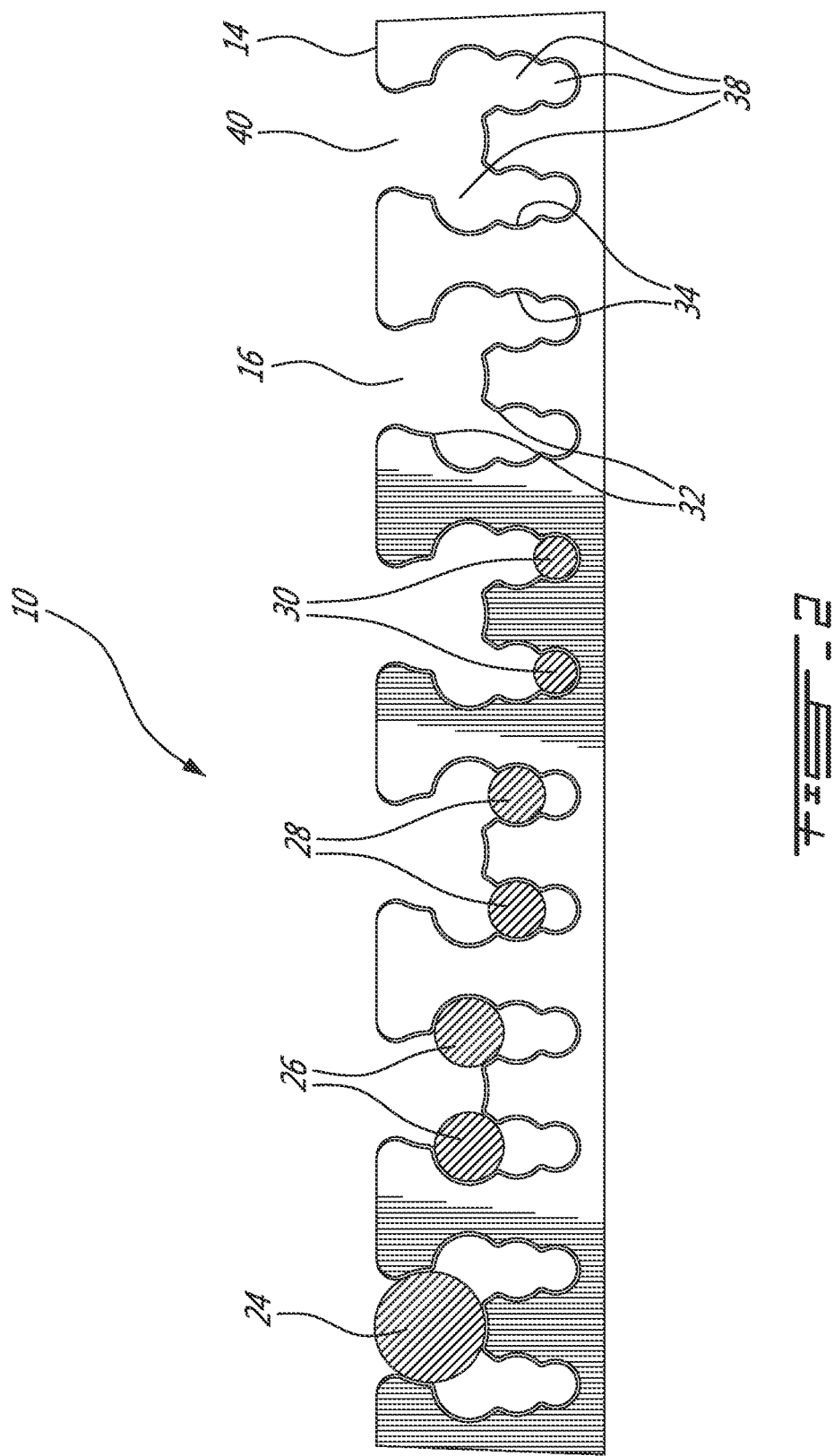
FIG. 2 provides a side plan view of a splice holder in accordance with an illustrative embodiment of the present invention.

Referring to FIG. 2, illustratively each splice receiver 16 can accommodate four (4) different diameters of splice, including a ribbon splice 24, a slim splices 26, mini splices 28 and micro splices splice 30. Diameters for the ribbon splice 24, slim splices 26, mini splices 28 and micro splices splice 30 are respectively circa 5 mm, 2.5 mm, 2 mm and 1.5 mm.

Figure 3:
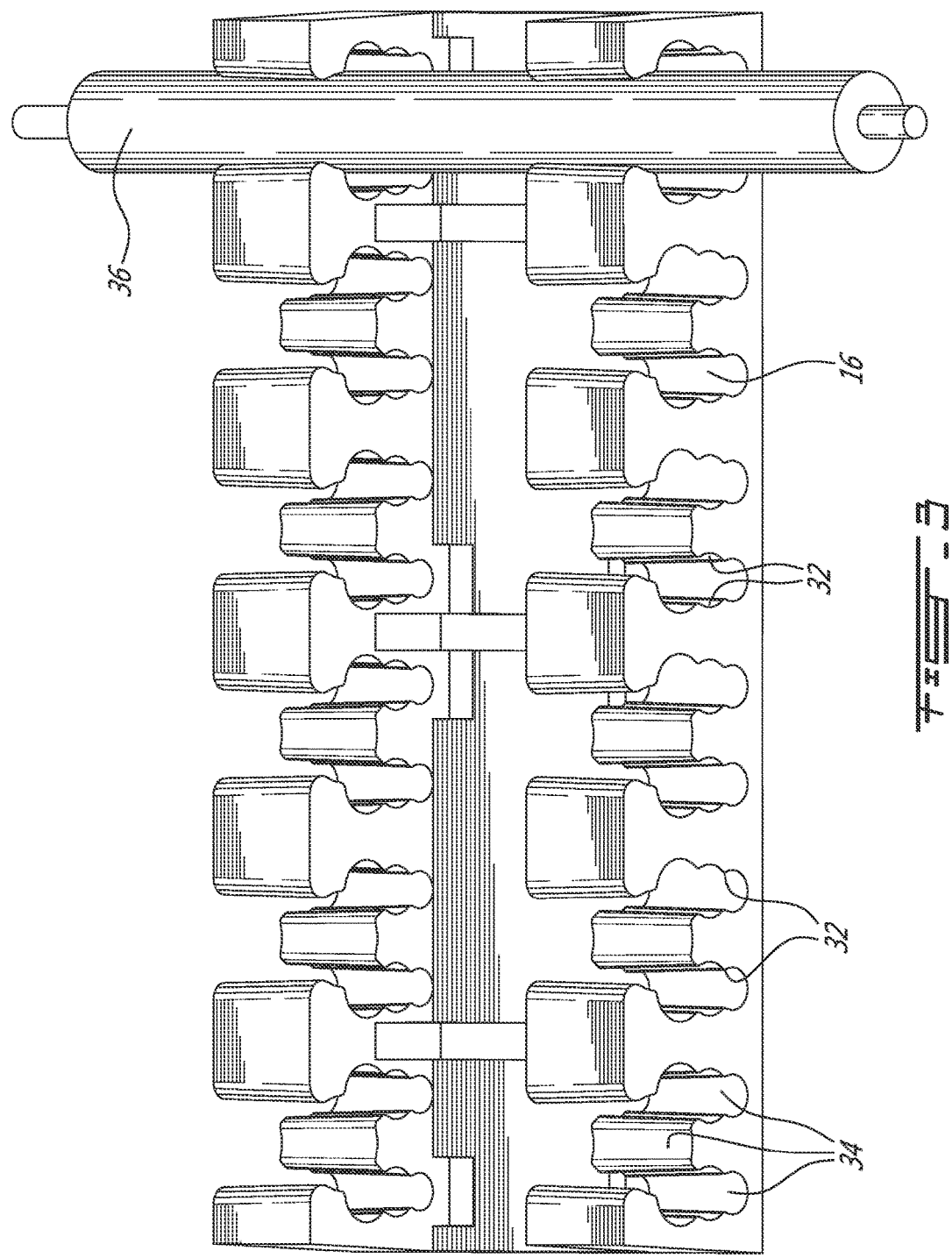
FIG. 3 provides a raised side view of a splice holder in accordance with an illustrative embodiment of the present invention.
Figure 4:
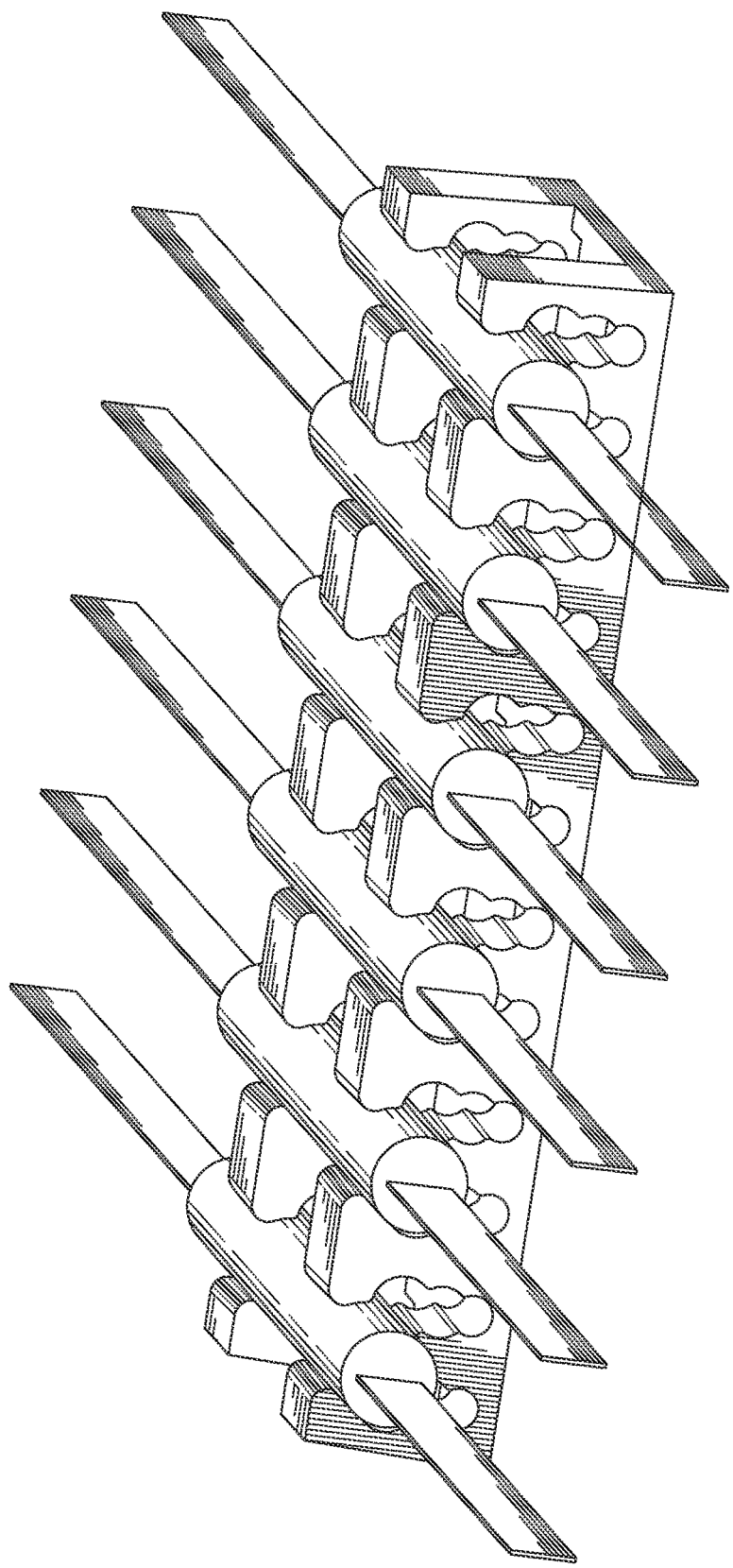

Referring now to FIG. 3, as discussed above, each receiver 16 comprises a complex inner gripping surface comprising a series of raised ridges 32 and surfaces as in 34 which grip and secure the splice 36 within the receiver 16 and in a given position depending on the splice's diameter.

Referring back to FIG. 2, in this regard each receiver 16 is comprised of a plurality of apertures as in 38 which are arranged in parallel and at right angles to their respective elongate edge members 14. The apertures as in 38 are arranged such that they are joined along their lengths with adjacent apertures, and only a single aperture of larger diameter. In this way the receiver 16 grows progressively narrower along its length. The largest diameter aperture is adjacent the opening 40.

Still referring to FIG. 2, in use the splice holder 10 can be placed in a splice tray, splice cassette, or any surface to which it can adhere such as metal or plastic panels. The splices as in 36 are then pushed though the opening 40 and until the appropriate diameter of aperture as in 38 is reached, thereby securing the splice 36 in the splice holder 10.

Referring back to FIG. 3, in a particular embodiment the gripping surfaces as in 34 are tapered slightly such that the outlets of each receiver 16 are slightly wider than the inlets, thereby easing release of the splice holder 10 from a mould (not shown) during fabrication.

Referring to FIGS. 4 through 7 the splice holder 10 of the present invention is shown accommodating respectively ribbon (FIG. 4), slim (FIG. 5), mini (FIG. 4) and micro (FIG. 7) splices.

Although the splice holder 10 is shown comprising two opposed sides as in 14 in a particular embodiment the splice holder 10 could comprise a single, illustratively wider, side as in 14 and such that each splice is held within a single receiver as in 16. Additionally, although FIGS. 4 through 7 disclose using the splice holder 10 with only a single size of splice 36, in a particular implementation different types of splices could be mixed together in the same splice holder 10.

Although the present invention has been described hereinabove by way of specific embodiments thereof, it can be modified, without departing from the spirit and nature of the subject invention as defined in the appended claims.

We claim:

1. A splice holder comprising:
   an elongate base comprising a flat lower surface and an upper surface; and
   a pair of opposed elongate edge members each attached along a respective long outer edge of said base, forming a gap between each other and projecting above said upper surface, each of said edge members further comprising a plurality of flexible splice receivers therein each receiver comprising an inner surface defining a plurality of apertures of circular cross section and different diameters arranged in parallel and for receiving splices of different diameters therein, wherein adjacent ones of said apertures are joined along a length thereof;
   wherein said plurality of apertures of each of said edge members comprises at least two apertures of the same first diameter and said two apertures of the first diameter are each adjacent only one aperture of a second, larger diameter and an aperture of a largest diameter is adjacent an opening;
   wherein each of said apertures in a first of said edge members is aligned with a corresponding aperture of a same diameter in a second of said edge members and such that, when a splice is inserted into the receivers via said opening, the splice is secured in parallel to said upper surface and at right angles to each of said edge members.

2. The splice holder of claim 1, wherein said base further comprises at a plurality of slots therein, each said slots configured to engage a securing tab.

3. The splice holder of claim 1, further comprising a plurality of stiffening reinforcements arranged laterally on said base and spanning a region between said pair of opposed edge members.

4. The splice holder of claim 1, wherein at least one of said apertures is dimensioned to receive one of at least four different diameters of splice.

5. The splice holder of claim 4, wherein said at least four different diameters of splice comprise a ribbon splice, a slim splice, a mini splice and micro splice.

6. The splice holder of claim 4, wherein said at least four different diameters of splice comprise a 5 mm splice, a 2.5 mm splice, a 2 mm splice and a 1 mm splice.

7. The splice holder of claim 1, wherein said flat lower surface is adhesive.

* * * * *